Patented Feb. 16, 1943

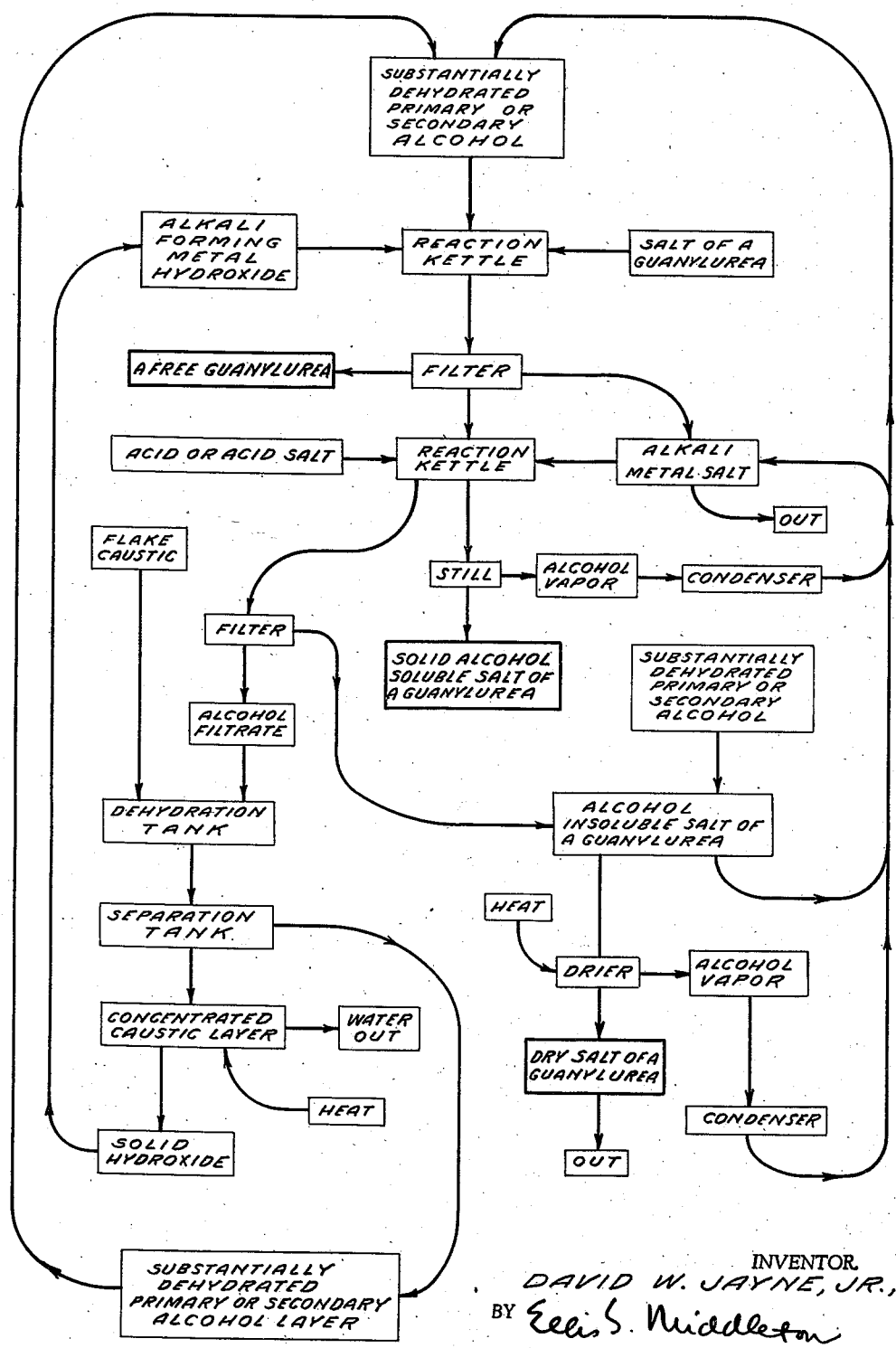

2,311,296

UNITED STATES PATENT OFFICE 2,311,296

PREPARATION OF GUANYL UREAS

David W. Jayne, Jr., Old Greenwich, Conn., assignor to American Cyanamid Company, New York, N. Y., a corporation of Maine Application March 1, 1941, Serial No. 381,253

5 Claims. (Cl. 260—553)

The present invention relates to the preparation of a free guanyl urea and to the conversion thereof to guanyl urea salts, the latter by means of a cyclic process.

The invention is particularly concerned with the production of such materials by a convenient method so as to obtain the products in a reasonable state of purity with optimum yields.

The interesting observation has been made that free guanyl ureas are soluble in water-soluble primary and secondary alcohols while alkali-forming-metal inorganic salts are not. The further observation has been made that a guanyl urea may be released from its salts by the use of an alkali stronger than the guanyl urea, for instance, the alkali-forming-metal hydroxides.

As a consequence of these observations, it is possible to react a guanyl urea salt and an alkali-forming-metal hydroxide in a substantially dehydrated primary or secondary alcohol. As a result of this reaction, a free guanyl urea is formed which immediately dissolves in the alcohol while the simultaneously produced alkali metal salt is precipitated. Thus by a simple filtration, the two may be separated and the free guanyl urea recovered as such from the alcohol filtrate. This is a particularly desirable method of recovering a free guanyl urea as compared to its recovery from water solutions by reason of the fact that comparatively high temperatures are not necessary and, consequently, decomposition is avoided.

In this phase of the invention, it is to be clearly understood that any substantially dehydrated primary or secondary alcohol may be used, of which methyl, ethyl, normal-propyl, isopropyl, normal-butyl, secondary butyl and isobutyl alcohols are preferred examples. It is, of course, desirable that the alcohol used in the process be substantially dehydrated in order to avoid a water solution of the guanyl urea and also a water solution of the alkali-forming metal salt, to any substantial extent.

Again it is to be understood that any salt of a guanyl urea may be used in this reaction, although the cheaper ones are preferred, such as guanyl urea sulfate, guanyl urea nitrate, guanyl urea hydrochloride, guanyl urea phosphate and the like.

As to the alkali used to free the guanyl urea from its salts, one must be used which has an alkalinity stronger than the guanyl urea. For this reason, the hydrates of sodium and potassium are preferred, although the hydroxides of any of the alkali-forming metals are reasonably useful.

In the second phase of the invention, the free guanyl urea either in alcoholic solution or in a dry state recovered therefrom, although preferably the former, may be used as a starting material for a cyclic method of converting the free guanyl urea of a salt thereof.

The above procedure is particularly desirable where the free guanyl urea is produced through reaction between an alkali-forming-metal hydroxide and a guanyl urea salt in a medium of a substantially dehydrated primary or secondary alcohol.

For instance, an alcoholic solution of the free guanyl urea as above produced, may be reacted with an acid or an acid salt to produce the desired guanyl urea salt. Those salts of a guanyl urea which are substantially insoluble in primary and secondary alcohols, are precipitated from the reaction menstruum and may be removed by a simple filtration operation. Thus, beginning with a cheap available salt of a guanyl urea, one may readily convert the same to a different guanyl urea salt with minimum difficulties, in good yields and in a good state of purity.

The entire method may be made cyclic if the alcoholic filtrate resulting from the separation of the thus produced guanyl urea salt is subjected to substantial dehydration, as by adding thereto a sufficient amount of a solid, substantially dry alkali-forming-metal hydroxide. This caustic material substantially dehydrates the alcohol and upon permitting the mixture to stand, stratifies. The upper layer is substantially dehydrated alcohol which may then be returned to the cycle as reaction medium for freeing additional quantities of a guanyl urea. The lower and heavily concentrated layer of caustic may, after water removal, also be returned to free additional quantities of a guanyl urea from its salts.

As a consequence of the above, the two phases of the invention are very definitely tied in together in a cyclic manner with minimum losses, both the recovered caustic and the alcohol being returned to the cycle for additional runs. Thus a smoothly running, economical method results.

Where the above-formed guanyl urea salt is soluble in the alcohol, it may be recovered by distilling the matter therefrom and returning the same, after dehydration if desired, to the cycle. Thus a cyclic process results even where soluble guanyl urea salts are produced.

The invention is more particularly illustrated in the flow sheet which diagrammatically illustrates a completely cyclic procedure.

Referring now to the flow sheet, it will be seen that it is proposed to react a guanyl urea salt with an alkali-forming-metal hydroxide in a medium of a substantially dehydrated primary or secondary alcohol. As a result of this reaction, there is formed the free guanyl urea which dissolves in the alcohol and an alkali-metal-salt which is precipitated. The latter is filtered and the cake may be washed with additional quantities of primary or secondary alcohol to free the salt from any of the adherent guanyl urea. The alcoholic solution of the guanyl urea may then be evaporated at atmospheric or reduced pressure as the case may be to recover the free guanyl urea in solid form and in a good state of purity.

In the event that the alcoholic solution of a guanyl urea is to be used for the production of a salt of a guanyl urea other than that used in the start of the process, it may be reacted with an acid or acid salt to form the corresponding guanyl urea salt. Where this latter substance is insoluble in the alcohol, it may be filtered out and recovered with appropriate washing where desired. The new guanyl urea salt, wet with alcohol, may be dried so as to recover the adherent alcohol which can then be returned to the cycle.

Where the thus produced guanyl urea salt is soluble in the alcohol, it may be recovered as such by simple evaporation of the solvent.

The alcoholic filtrate, no longer dehydrated by reason of the presence of chemical water therein, may then be substantially dehydrated by adding thereto solid caustic preferably in the form of alkali-forming-metal hydroxide. Upon permitting this mixture to stand, stratification takes place with the formation of two layers. The upper one is the substantially dehydrated alcohol which can be returned to the start of the cycle. The lower layer is a heavily concentrated water solution of caustic which may be returned to the cycle as such or where desired, may be further concentrated to remove a part or all of its contained water.

*Example I*

100 grams of guanyl urea nitrate are slurried in 200 cc. of substantially anhydrous 2-B alcohol and 39 grams of KOH in 200 cc. of 2-B alcohol (the technical designation of a substantially anhydrous mixture of ethyl alcohol containing .5% benzene) added. The mix is warmed to 50° C. and after reaction is complete, cooled to room temperature. The thus precipitated potassium nitrate is filtered therefrom and the alcohol distilled from the filtrate, condensed, recovered and recycled. The resulting sticky free guanyl urea residue from the alcohol distillation, upon further treatment with ether, followed by drying, yields dry solid guanyl urea in a good state of purity.

*Example II*

A 2-B alcoholic solution of guanyl urea, prepared for instance as in Example I, is saturated with $CO_2$ to form a clear solution of guanyl urea carbonate. This is recovered by evaporation of the alcohol, the latter being condensed and returned to the cycle.

*Example III*

100 grams of substantially anhydrous guanyl urea sulfate are slurried in 200 cc. of substantially anhydrous secondary butyl alcohol to which is added 42 grams of NaOH in 200 cc. of secondary butyl alcohol. The mix is warmed to 50° C. and after the reaction is complete, cooled to room temperature and the precipitated sodium sulfate removed by filtration. The free guanyl urea may be recovered from the filtrate by evaporation of the alcohol. As in Example I, this alcohol, upon condensation, may be recycled.

*Example IV*

A secondary butyl alcohol solution of guanyl urea prepared as in the above example, is treated with an alcoholic solution of 100 grams of benzene sulfonic acid, whereupon guanyl urea benzene sulfonate precipitates and may be recovered. The no longer dehydrated butyl alcohol may then be dehydrated by adding thereto flake caustic soda, the mix agitated and permitted to stratify. The upper layer of substantially dehydrated butyl alcohol is returned to the cycle. The lower heavily concentrated solution of caustic is then dehydrated and returned to the cycle.

*Example V*

A solution of free guanyl urea in isopropyl alcohol, prepared, for instance, by a method similar to that of Example I is treated with 75 grams of 85% phosphoric acid. As a result, monoguanyl urea phosphate is precipitated in good yields and may be filtered therefrom and recovered as a dry product.

*Example VI*

The alcoholic filtrate may be dehydrated and the alcohol and caustic returned to the cycle as in Example IV.

While the invention has been shown and described with particular reference to specific embodiments, it is to be understood that it is not to be limited thereto but is to be construed broadly and restricted solely by the scope of the appended claims.

I claim:

1. A method of preparing a free guanyl urea which comprises reacting an alkali-forming-metal hydroxide with an inorganic salt of a guanyl urea in the presence of a substantially anhydrous alcohol chosen from the group consisting of primary and secondary alcohols and filtering off the insoluble alkali metal salt.

2. A method of preparing a free guanyl urea which comprises reacting an alkali-forming-metal hydroxide with an inorganic salt of a guanyl urea in the presence of a substantially anhydrous alcohol chosen from the group consisting of primary and secondary alcohols and filtering off the insoluble alkali-metal salt, and recovering the free guanyl urea from the filtrate.

3. The method of claim 1 in which the hydrate is that of sodium.

4. The method of claim 1 in which the alcoholic medium is ethyl alcohol.

5. The method of claim 1 in which the hydrate is of sodium and the alcoholic medium is ethyl alcohol.

DAVID W. JAYNE, Jr.